No. 808,491. PATENTED DEC. 26, 1905.
C. S. TARKINGTON.
FERTILIZER DISTRIBUTER.
APPLICATION FILED SEPT. 23, 1905.
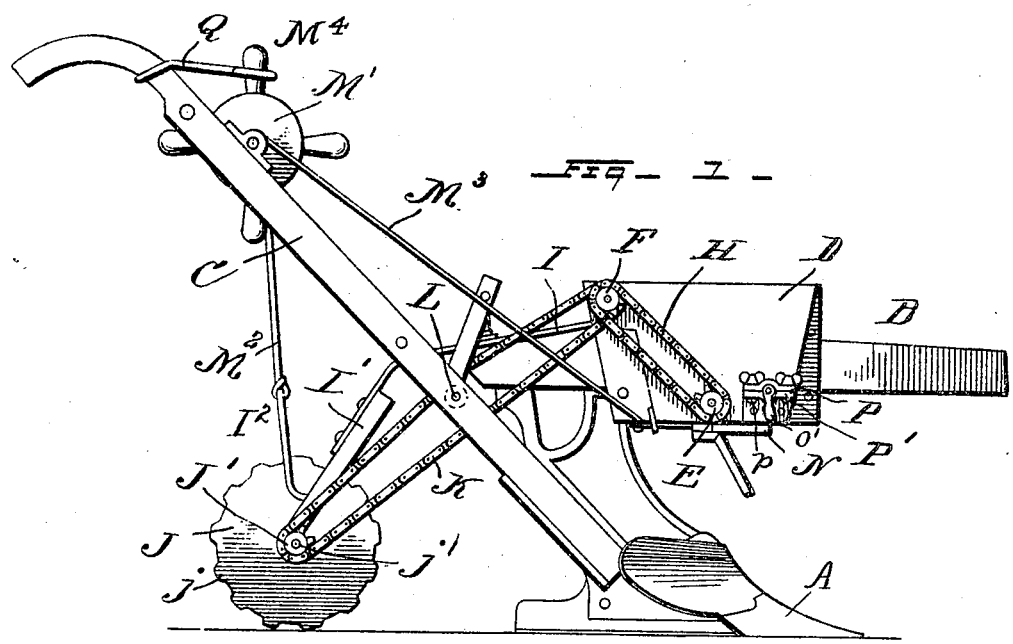
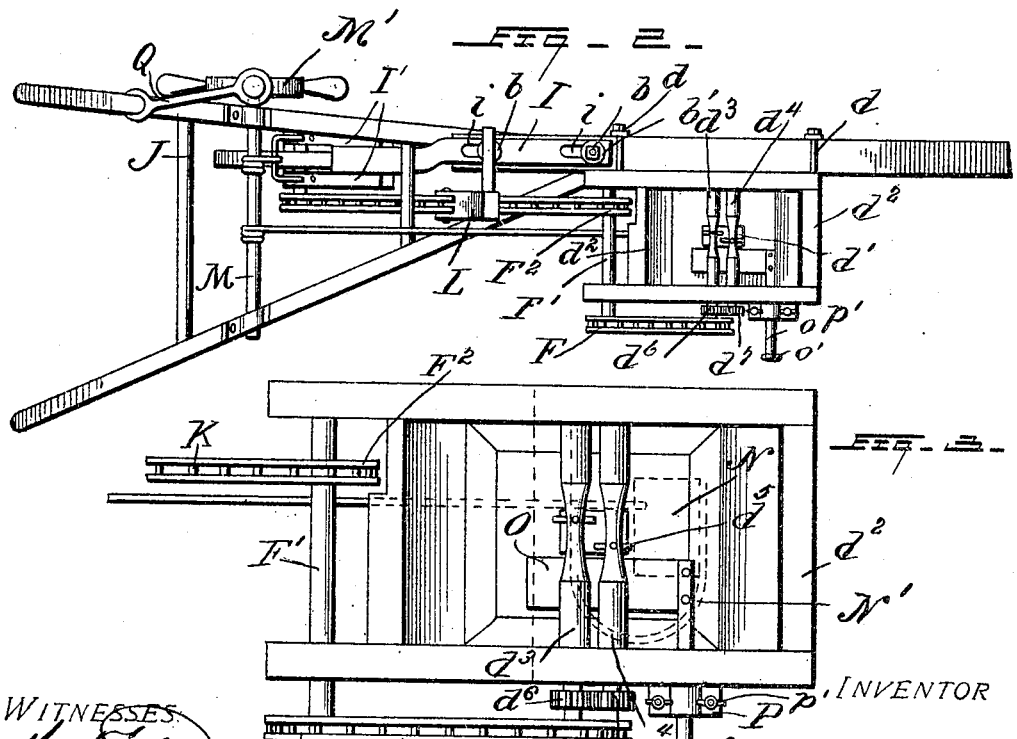

UNITED STATES PATENT OFFICE.

CORNELIUS S. TARKINGTON, OF SKINNERSVILLE, NORTH CAROLINA.

FERTILIZER-DISTRIBUTER.

No. 808,491. Specification of Letters Patent. Patented Dec. 26, 1905.

Application filed September 23, 1905. Serial No. 279,838.

*To all whom it may concern:*

Be it known that I, CORNELIUS S. TARKINGTON, a citizen of the United States, residing at Skinnersville, in the county of Washington and State of North Carolina, have invented certain new and useful Improvements in Fertilizer-Distributers; and I do hereby declare the following to be a full, clear, and exact description of the invention, such as will enable others skilled in the art to which it appertains to make and use the same.

My invention relates to improvements in the class of fertilizer-distributers, and particularly to those attached to plows.

In order that my invention may be thoroughly understood, I have clearly illustrated the same in the accompanying drawings, and a full and exact description thereof is contained in the annexed specification.

In the accompanying drawings, Figure 1 is a side elevation of my improved device attached to a plow. Fig. 2 is a top plan view thereof, and Fig. 3 is an enlarged top plan view of the distributing-box.

In the several views like letters of reference designate similar parts of my improved device.

In the drawings, A designates the plow, B the plow-beam, and C the handle, said parts being of any well-known construction.

D is the distributing box or hopper, secured by any suitable means, as the bolts $d$, to the side of the plow-beam and is provided at its bottom with the opening $d'$, toward which the end pieces $d^2$ $d^2$ preferably converge to guide the contents of the box to said opening. $d^3$ and $d^4$ are parallel rollers or shafts revolubly mounted in said box directly over said opening $d'$ and are provided with the radially-extending projections $d^5$, which tend to agitate the contents and force the same through the opening $d'$. The ends of said rollers $d^3$ and $d^4$ preferably extend through the side of the hopper and are provided with the intermeshing pinions $d^6$ and $d^7$, respectively.

E is a sprocket-wheel mounted on the end of the roller $d^3$ and is connected with a sprocket-wheel F, mounted on the revoluble shaft F', by an endless chain H.

I is a spring-arm adjustably attached to the plow-beam, being provided with slots $i$ to receive bolts $b$ on the plow-beam, said bolts being provided with nuts $b'$, adapted to lock said spring-arm in position. Said arm is bent downwardly at its end and is provided with a fork portion I', in which a disk J is revolubly mounted, said disk being normally and yieldingly held in contact with the ground and provided with projections $j$ to prevent the same from slipping thereon. Disk J is rigidly mounted on a shaft $j'$, which is journaled in bearings in said fork portion, said shaft $j'$ being provided at its outer end with a sprocket-wheel J', which is connected by an endless chain K to a sprocket-wheel F² on shaft F'.

L is an idle wheel bearing upon the chain K to take up the slack, as shown in dotted lines, Fig. 1.

M is a shaft revolubly mounted on the handles C and is provided at its end with a hand-wheel M'. M² is a rope or the like secured at one end to said shaft M and at the other to arm I.

N is a cut-off plate secured to the free end of a spring N' and working on the under side of the hopper (shown in dotted lines, Fig. 3) and is constructed to close the opening $d'$ in the bottom of the box, but is normally held by said spring out of registration with said opening.

M³ is a rope or the like secured at one end to shaft M and at its other end to an extension on cut-off plate N.

O is a regulating-plate located beneath the rollers $d^3$ and $d^4$ and is provided with an arm $o$, extending at right angles therefrom and passing through an opening in the side of the hopper.

$o'$ is a handle secured to the arm $o$ to facilitate its adjustment. P and P' are clamping members constructed to embrace said arm $o$, the lower member being rigidly secured to the box. $p$ $p$ are bolts passing through said clamping members and are provided with wing-nuts $p'$ $p'$, adapted to draw said clamping members together to hold said arm in position.

From the foregoing description the operation of my device is apparent and is as follows: The spring-arm I is first adjusted on the plow-beam, so that the disk J will bear upon the ground. The regulating-plate is then adjusted and the clamps drawn tight on the arm thereof. The device is then ready for operation, and when the plow is pulled forward it is obvious that motion will be transmitted from the disk J to shaft F', and thence to the rollers $d^3$ and $d^4$, which force the contents of the box through the opening $d'$. When desirable to stop the distribution of the contents of the hopper, the hand-wheel M' is rotated, whereupon the ropes M² and M³ are wound around the shaft M, thereby simultaneously raising the disk J from the ground and drawing the cut-off plate N into registration with opening $d'$, thus preventing the outflow of the contents. In order to retain the parts in this position, a loop Q is secured to the handles and is constructed to engage a projection M⁴ on said wheel M'.

What I claim, and desire to secure by Letters Patent, is—

1. In a device of the kind described, the combination with a soil-turning implement, of a hopper mounted thereon and provided with a discharge-opening, a cut-off for said discharge-opening, agitating mechanism in said hopper, a movable arm secured to said implement, a revoluble disk mounted on said arm, operative connections between said disk and agitating mechanism and means for simultaneously raising said disk and closing said discharge-opening, substantially as described.

2. In a device of the kind described, the combination with a soil-turning implement, of a hopper mounted thereon and provided with a discharge-opening, a cut-off for said opening, agitating mechanism in said hopper, a revoluble disk adapted to bear upon the ground, operative connections between said disk and agitating mechanism, a revoluble shaft mounted on said implement connections between said shaft and cut-off and said revoluble disk whereby said discharge-opening may be closed and said disk simultaneously disengaged from the ground, substantially as described.

3. In a device of the kind described, the combination with a plow, of a hopper mounted upon the beam thereof and provided with a discharge-opening, of rollers revolubly mounted in said hopper directly over said opening, means for regulating the size of said opening, a cut-off for said opening, an adjustable spring-arm secured to said plow, a revoluble disk mounted thereon, operative connections between said disk and rollers, a shaft revolubly mounted on the plow-handles and provided at its end with a hand-wheel, connections between said shaft and spring-arm and said cut-off for said opening, whereby when said hand-wheel is turned, said disk will be raised and said discharge-opening closed, and means for locking said revoluble shaft, substantially as described.

In testimony whereof I affix my signature in the presence of two witnesses.

CORNELIUS S. TARKINGTON.

Witnesses:
  H. H. TARKINGTON
  E. C. TARKINGTON.